(12) United States Patent
Denninghoff (10) Patent No.: US 7,532,732 B2
(45) Date of Patent: May 12, 2009

(54) METHOD AND APPARATUS FOR VOIP TELEPHONY CALL ANNOUNCEMENT

(75) Inventor: Karl Denninghoff, Bothell, WA (US)

(73) Assignee: Intel Corporation, Santa Clara, CA (US)

( * ) Notice: Subject to any disclaimer, the term of this patent is extended or adjusted under 35 U.S.C. 154(b) by 896 days.

(21) Appl. No.: 10/608,358

(22) Filed: Jun. 26, 2003

(65) Prior Publication Data

US 2004/0228476 A1  Nov. 18, 2004

Related U.S. Application Data

(60) Provisional application No. 60/319,366, filed on Jun. 28, 2002.

(51) Int. Cl.
*H04R 5/02* (2006.01)

(52) U.S. Cl. ............... 381/309; 455/567; 439/669; 370/395.52

(58) Field of Classification Search ............ 381/77, 381/82, 300, 309, 306, 1, 81, 80; 370/395.52; 379/48, 428.02, 90.01; 439/668, 669; 455/567
See application file for complete search history.

(56) References Cited

U.S. PATENT DOCUMENTS

| | | | | |
|---|---|---|---|---|
| 5,889,843 A * | 3/1999 | Singer et al. | ........... | 379/202.01 |
| 6,350,150 B2 * | 2/2002 | DeLadurantaye, III | ...... | 439/502 |
| 6,653,934 B2 * | 11/2003 | Pan et al. | ............... | 340/384.73 |
| 6,826,174 B1 * | 11/2004 | Erekson et al. | ............. | 370/352 |
| 7,110,799 B1 * | 9/2006 | Willins et al. | ............ | 455/575.2 |
| 2003/0196249 A1 * | 10/2003 | Roberts | ..................... | 2/209.13 |

\* cited by examiner

*Primary Examiner*—Vivian Chin
*Assistant Examiner*—Con P Tran
(74) *Attorney, Agent, or Firm*—Blakely, Sokoloff, Taylor & Zafman LLP (57) ABSTRACT

A system and method for call announcement using a typical computing device permits a typical computing device, such as a PDA, to be used more effectively for telephony. In particular, a novel headphones connector and a software program/module being executed by the computing device are combined together to implement the call announcing method. The system permits the sound output of the computing device to be split in various manners in order to permit the computing device to be operated as a telephony device.

28 Claims, 5 Drawing Sheets

METHOD AND APPARATUS FOR VOIP TELEPHONY CALL ANNOUNCEMENT

PRIORITY CLAIM

This application claims priority under 35 USC 119(e) from U.S. Provisional Patent Application Ser. No. 60/319,366, filed on Jun. 28, 2002 and entitled "A Method And Apparatus For VoIP Telephony Call Announcement" which is incorporated herein by reference.

FIELD OF THE INVENTION

The present invention is an apparatus and method for achieving an announcement of an incoming phone call, page, e-mail etc. via an audible ring, vibration of a PDA, flashing of a view screen, flashing of an antenna etc. on a device when used as a telephony device when the device is configured to operate using a headphone.

BACKGROUND OF THE INVENTION

A problem encountered when using a PDA (Personal Digital Assistant) as a telephony device with a headset connected is that the call or page is not announced or announced sufficiently to get the attention of the user. The typical PDA, such as an IPAQ, Palm Pilot etc., has a mechanical switch that is caused to assume an open position when the headset connector (jack) is inserted into the PDA. The insertion of the jack disconnects the speaker of the PDA, in some models, from the sound output. In other PDAs, the circuitry for an external speaker is short circuited or by-passed and will not function when the headset connector is in place. Thus, the sound generated by the device is only output through the headset and might not be heard by the user.

In the above situations the ability of the PDA to be used as a telephony device is impaired because, unless the typical headset is inserted in or is very near the user's ear, it cannot be heard. If the user forgets to unplug the headset after finishing a call, he will easily miss the next call since such headsets are typically not capable of generating a sufficient sound volume level to alert the user to a new incoming phone call, page or e-mail. Thus, the typical PDA with a headset cannot be used or is of limited use for the reason as a phone.

An additional problem encountered by typical devices, such as PDAs, is that the built in speaker on a PDA may be inconveniently located relative to the built-in microphone; which can effectively preclude use of the device as a telephone without resort to external headphones or speakers. For example, the speaker may be adjacent to the microphone making it impossible to locate the speaker near the ear while at the same time the microphone is near the mouth. So, to use a PDA as a cell phone is normally used, i.e., in-hand with the cell phone held against the head, often requires that a second speaker be located in a different position from that of the built-in speaker.

Another problem existing in typical PDAs and addressed by the present invention is that, in order to use the telephony device (e.g., PDA) as a speaker phone, it is necessary to unplug the earphone speakers and use the on-board speakers, or plug in external speakers, which have sufficient volume to project the sound in a room. Therefore, it is desirable to provide a mechanism for permitting the sound output of the typical device to be routed to both the external speakers as well as the headphone set.

Another limitation of typical PDAs is that it is difficult to switch between a private call (using the headphones) and a conference call (using external speakers.) In particular, most typical devices will require the user to plug/un-plug devices in order to switch between those devices which is inconvenient to the user. Therefore, it is desirable to provide a mechanism for switching between different modes of operation (i.e., a private call mode and a conference call mode) without requiring the physical connection/disconnection of sound output devices.

The present invention allows a connector component to be inserted in the PDA or computation device, which in conjunction with appropriate software control program, such that the software is aware of the special nature of the device attached and uses that knowledge effectively, advantageously solves the above described problems and limitations of the typical devices. Thus, it is desirable to provide a system and method for VoIP telephony call announcement and it is to this end that the present invention is directed.

SUMMARY OF THE INVENTION

A system and method for call announcement using a typical computing device is described. The invention permits a typical computing device, such as a PDA, to be used more effectively for telephony. To accomplish this, the present invention provides a novel headphones connector and a software program/module being executed by the computing device that together implement the call announcing method in accordance with the invention. In particular, the sound output of the computing device may be split in various manners as described below in order to permit the computing device to be operated as a telephony device. Thus, in one embodiment of the present invention, one output would be routed to external speakers and the other output to a headphone set wherein the external speakers would be used to announce calls and the headphone for voice communication when the phone is used for a private conversation as a standard telephone is normally used. To use the PDA as a speaker phone, also commonly called conference mode, the voice traffic sound would be output to the external speakers as well as to the headphone set. The input microphone would nominally be set to a higher gain setting in speaker or conference mode so that all conversation would be captured.

In accordance with the invention, no physical connection is broken or made in order to change the mode of operation (from a private call using headsets/headphones) to a conference call using external speakers and vice versa) of the computing device as is required with typical devices as set forth above. A conference call here is defined as a call where the incoming sound is projected into a room or space and the microphone is used to pick up multiple users and a private call is a call where sound is output to a lower decibel device designed for the ear of one user. It is much more convenient to use the present invention as it can be achieved by the press of a button on the device. The button activation includes any of a host of well known ways to engage a PDA or similar de ice and is not limited to the notions of electromechanical buttons in that it comprises discrete moving parts, or a touch-pad view screen button, or a mouse or mouse-driven button.

In some environments, a full-sound speaker, as opposed to a simple buzzer or ringer, capable of outputting sufficiently loud call announcements (e.g. ring tones) may be larger than can effectively be used as an add-on component. Moreover, if in a particular case the size or shape of the physical device used is at issue, then a solution that is smaller or differently configured in some dimension may be needed. An aspect of the present invention solves this problem by using a smaller and simpler buzzing or ringing device. In a further aspect of the present invention, the view screen is flashed without and additional auditory announcement to indicate that an incoming call, e-mail, voice mail, page or transmission of some type is taking place.

In an additional embodiment of the present invention, an antenna of the device is equipped with a fiber optic or similar type end piece that lights up and flashes continually or intermittently to indicate the presence of a new call, e-mail, voicemail or page. Furthermore, this embodiment can also be used to indicate calendar events, such as a meeting or event, by flashing the antennae or utilizing some other visual or auditory cue or signal.

DETAILED DESCRIPTION OF A PREFERRED EMBODIMENT

The invention is particularly applicable to a call announcement for a personal digital assistant (PDA) VoIP enabled telephony system and it is in this context that the invention will be described. It will be appreciated, however, that the system and method in accordance with the invention has greater utility since the various aspects of the invention may be implemented on a variety of other computing devices and the various aspects of the invention may be used with other non-VoIP communications systems, such as cellular phone systems, wireless phone systems, etc. . . . , in which it is desirable to be able to perform telephony functions and operations. In addition, the invention may be used to announce various types of events, including incoming calls (as described below), incoming email messages, incoming pager messages, etc.

Figure 1:
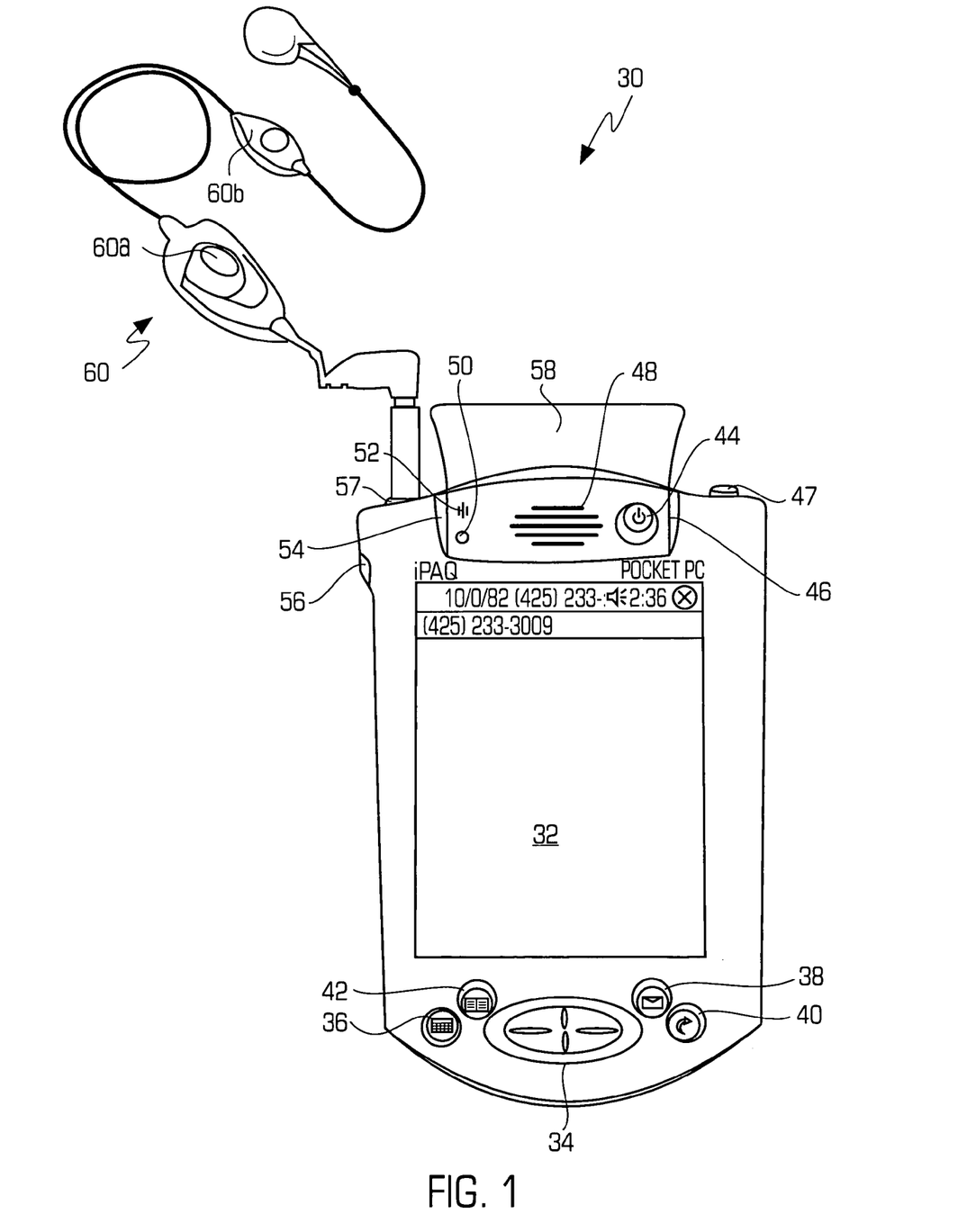
FIG. 1 is a diagram illustrating a typical computing device, such as a PDA, being used as a telephony device.

FIG. 1 is a diagram illustrating a typical computing device 30, such as a PDA, being used as a telephony device. In accordance with the invention, the computing device may be any device with sufficient computing power and memory to implement a telephony system. Thus, the computing device shown in FIG. 1 is merely representative of the various different computing devices which may be used. The computing device 30 shown is a Compaq iPAQ device running a typical operating system, such as the PocketPC 2002 operating system from Microsoft, that has a microprocessor and memory as is well known. For example, the memory may store the operating system as well as other software programs being executed by the microprocessor such as the call announcement control program described below in more detail. The computing device 30 comprises a display 32, such as a color LCD display with an integrated touchscreen, that displays a user interface of the VoIP software application and permits the user to interact with any application via the touchscreen and one or more user input buttons including, for example, a directional pad 34, a calendar button 36, an inbox button 38, a task manager button 40 and a contacts button 42. The computing device 30 further may comprise a power button 44, a charging/notification indicator 46, a stylus 47, a speaker 48, an ambient light sensor 50, a microphone 52, an active Bluetooth indicator 54, a record button 56 and a stereo headset jack 57. To implement a telephony device, the computing device 30 further comprises a wireless plug-in card 58, such as a 802.11b card, and a headset 60 with adapter (including a call button 60a and a microphone 60b, and the VoIP software program that is resident in the memory of the computing device and executed by the microprocessor of the computing device. The computing device memory may also contain the control program that implements the call announcement method. The call announcement control program may also be part of the VoIP software program.

The invention comprises a physical configuration of sound transmission and output devices connected to a stereo output jack of the computation device, and the control program to control sound output in the particular physical configuration in order to announce calls as well as provide telephony connections to the user. This is accomplished conveniently and advantageously without changing physical configuration each time a call is answered or terminated. Various configurations of the general mechanism is disclosed with the relative advantages of each.

The present invention uses the fact that, unlike telephony devices, most audio output is stereo on the computation devices, including the majority of currently produced PDAs. Thus, the left and right side of the audio output can be controlled so as to produce two channels of independent sound. While standard telephony is monaural in nature, most sound output hardware on PDAs and other personal computation devices, such as PCs, is stereo. The sound devices (on a PC a sound card or equivalently the integrated sound playback hardware on a PDA) for VoIP are normally opened in the efficient "mono" mode, whether or not dual headphones are utilized by the user. It is nevertheless possible to open the devices in stereo mode so as to control the two sides independently and thereby control unmatched devices of widely differing audio output characteristics separately. The two devices used are typically a headphone (or a pair of headphones) that are driven by the first output, such as a right (resp. left) output, while a higher decibel speaker, buzzer, or ringer is driven independently by a second output, such as the left (resp. right) output. Now, several embodiments of a headset in accordance with the invention that may be used to implement the call announcement system in accordance with the invention will be described.

Figure 2:
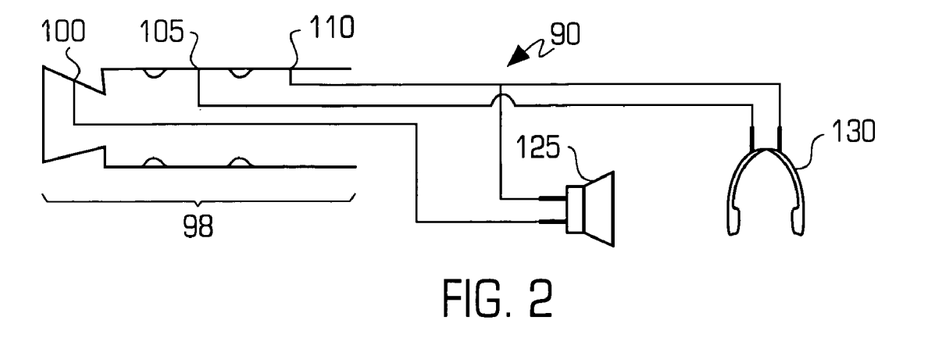
FIG. 2 is a diagram showing a configuration of event announcement devices comprising an open air speaker and a pair of headphones connected to a single stereo jack.

FIG. 2 is a diagram showing a configuration of event announcement device 90 in accordance with the invention comprising an open air speaker 125 and a pair of headphones 130 connected to a single stereo jack 98. In particular, since the computing device generates stereo sound output, the left and right channel signals are separated from each other and are separately controllable. In particular, as shown in FIG. 2, the male audio connector (which plugs into the female connector located in the computing device) has a first portion 100, a second portion 105 and a third portion 110 that are electrically isolated from each other as is well known. The first portion may carry the electrical signals for a first channel (the left output typically), the second portion may carry the electrical signals from a second channel (the right output typically) and the third portion may be a ground connection. Thus, in accordance with the invention, the speaker 125 may be connected to the first portion 100 and the third portion 110 while the headphones 130 may be connected to the second portion 105 and the third portion 110. Thus, using the single stereo jack 98, signals may be output to both the speaker 125 and headphones 130 using the first and second channels of the stereo jack 98. In accordance with the invention, the computing device may be executing a control program that properly sends the same output signals to both the speaker 125 and headphones 130 so that the computing device using this novel event announcement device 90 is able to be operated as both a typical telephone (using the headphones) and a speakerphone (using the speaker) as will be described in more detail below.

Thus, as shown in FIG. 2, the speaker and headphone are in one embodiment connected because they must be driven from the same stereo output jack. However, in one aspect of the invention, the stereo output is split into two monaural sound outputs by a splitter jack, and the output is then connected to the headset(s) and the speaker(s) independently; with one to the left side and the other to the right side of the split sound. Equivalently, the split can occur as a stereo Y configuration, and only the left or only the right half of the sound used on each of the two outputs.

Figure 3:
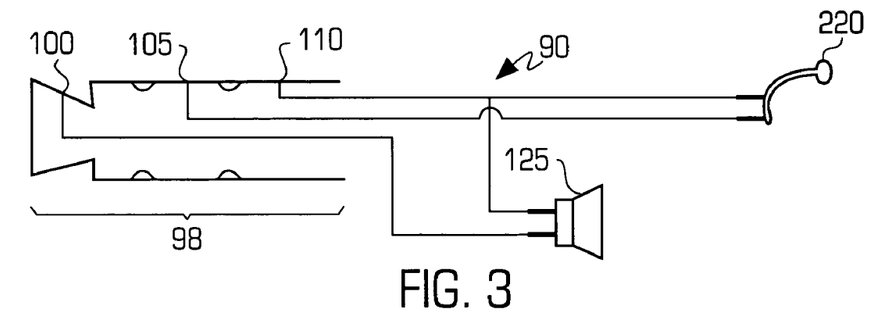
FIG. 3 is a diagram showing a configuration of event announcement devices comprising an open air speaker and an in-the-ear speaker connected to a single stereo jack.
Figure 4:
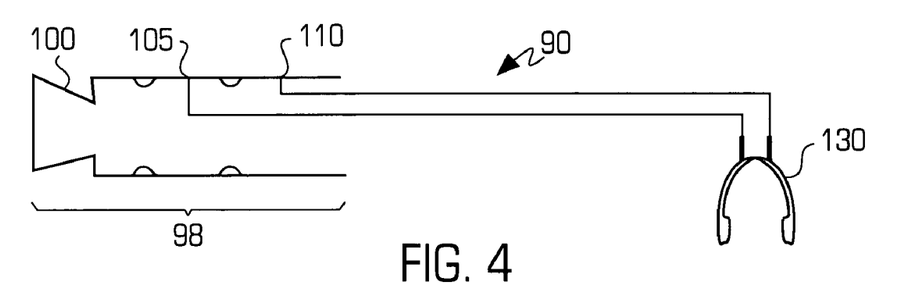
FIG. 4 is a diagram showing a configuration comprising an open air speaker and a pair of headsets connected to a single stereo jack which is used in conjunction with an internal connection of the left output to the integrated speaker.
Figure 5:
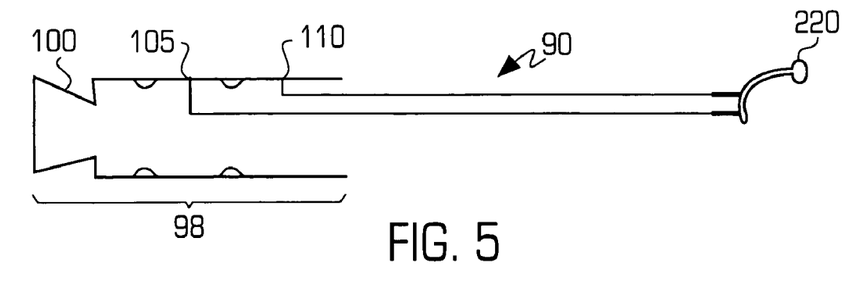
FIG. 5 is a diagram showing a configuration of event announcement devices comprising an in-the-ear speaker connected to a single stereo jack which is used in conjunction with an internal connection of the left output to the integrated speaker.

FIG. 3 is a diagram showing a configuration of the event announcement device 90 comprising an open air speaker 125 and an in-the-ear speaker 220 connected to the single stereo jack 98. As above, the stereo jack has the three portions 100, 105, 110 so that output signals for the speaker 125 and the in-ear speaker 220 may be output to each speaker wherein each output signal is independently controlled. FIG. 4 is a diagram showing another configuration of the event announcement device 90 comprising the pair of headsets 130 connected to the single stereo jack 98 which may be used in conjunction with an internal connection of the left output to the integrated speaker. In particular, the headphones 130 are connected to one channel (the right output in this example) of the stereo jack 98 while the left audio output of the computing device is connected internally in the computing device to the speaker 48 of the computing device (See FIG. 1) to provide the same capability of a private conversation output device (the headphones 130) and a speakerphone (using the internal speaker 48) without any physical disconnection/connection of sound generating devices. FIG. 5 is a diagram showing another configuration of event announcement device 90 comprising the in-the-ear speaker 220 connected to a single stereo jack 98 which is used in conjunction with an internal connection of the left output to the integrated speaker for the same purposes as the configuration shown in FIG. 4.

Figure 6:
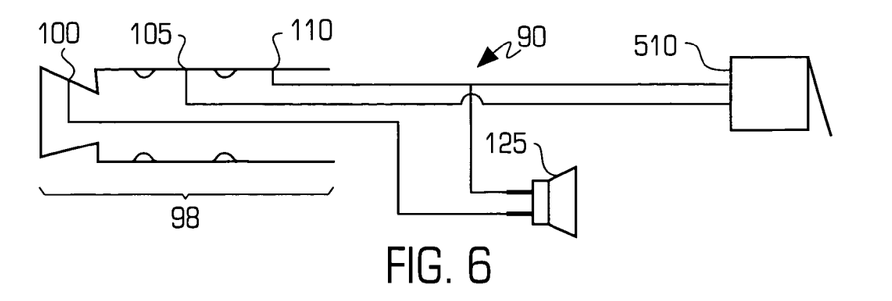
FIG. 6 is a diagram showing a configuration of event announcement devices comprising an open air speaker and a buzzer or ringer connected to a single stereo jack.
Figure 7:
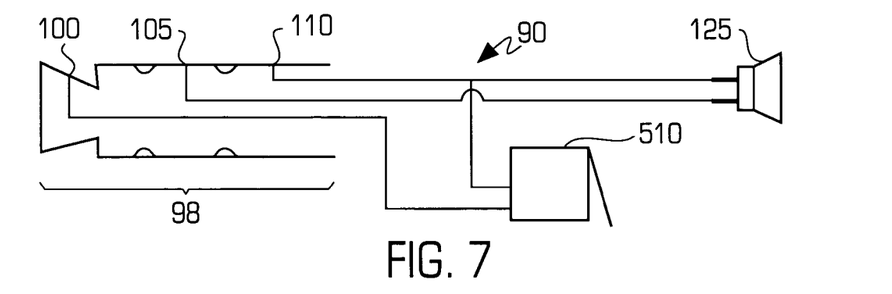
FIG. 7 is a diagram showing a configuration of event announcement devices comprising an open air speaker and a buzzer or ringer connected to a single stereo jack.
Figure 8:
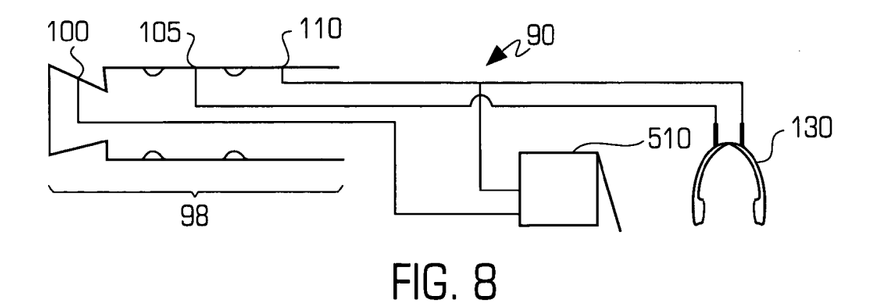
FIG. 8 is a diagram showing a configuration of event announcement devices comprising a pair of headphones connected to the right output and a buzzer or ringer connected to the left output.
Figure 9:
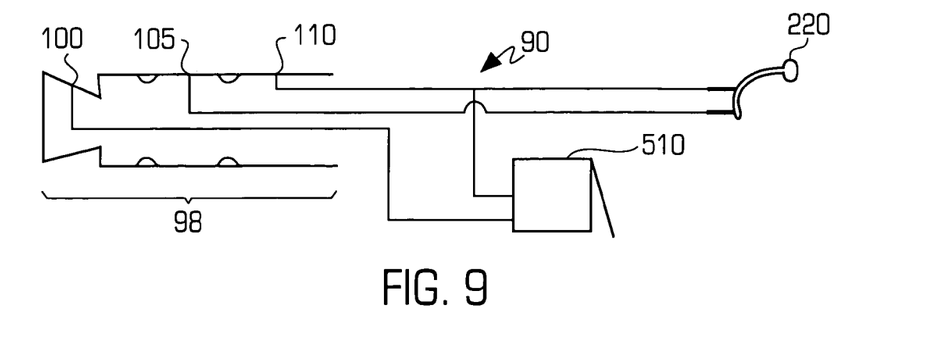
FIG. 9 is a diagram showing a configuration of event announcement devices comprising an in-the-ear headphone connected to the right output and a buzzer or ringer connected to the left output.

FIG. 6 is a diagram showing a configuration of the event announcement device 90 comprising the open air speaker 125 and a buzzer or ringer 510 connected to the single stereo jack 98 while FIG. 7 is a diagram showing a configuration of the event announcement device 90 comprising the open air speaker 125 and the buzzer or ringer 510 connected to the single stereo jack 98 except that the right output is connected to the speaker whereas in FIG. 6 it is the left output connected to the speaker. FIG. 8 is a diagram showing a configuration of the event announcement device 90 comprising the pair of headphones 130 connected to the right output and the buzzer or ringer 510 connected to the left output of the single jack 98. In addition, FIG. 9 is a diagram showing a configuration of the event announcement device 90 comprising the in-the-ear headphone 220 connected to the right output and the buzzer or ringer 510 connected to the left output of the single jack 98. As above, these configurations permit both the speaker/headphones or in-ear headphones and the buzzer/ringer 510 to be sent output signals which announce an incoming event, such as a call, email or page wherein the operation of the particular output device is controlled as described below in more detail. Now, a method for call announcement in accordance with the invention that is implemented in this example utilizing the different examples of the sounds creation devices set forth above and a control program being executed by the computing device will be described.

Figure 10A:
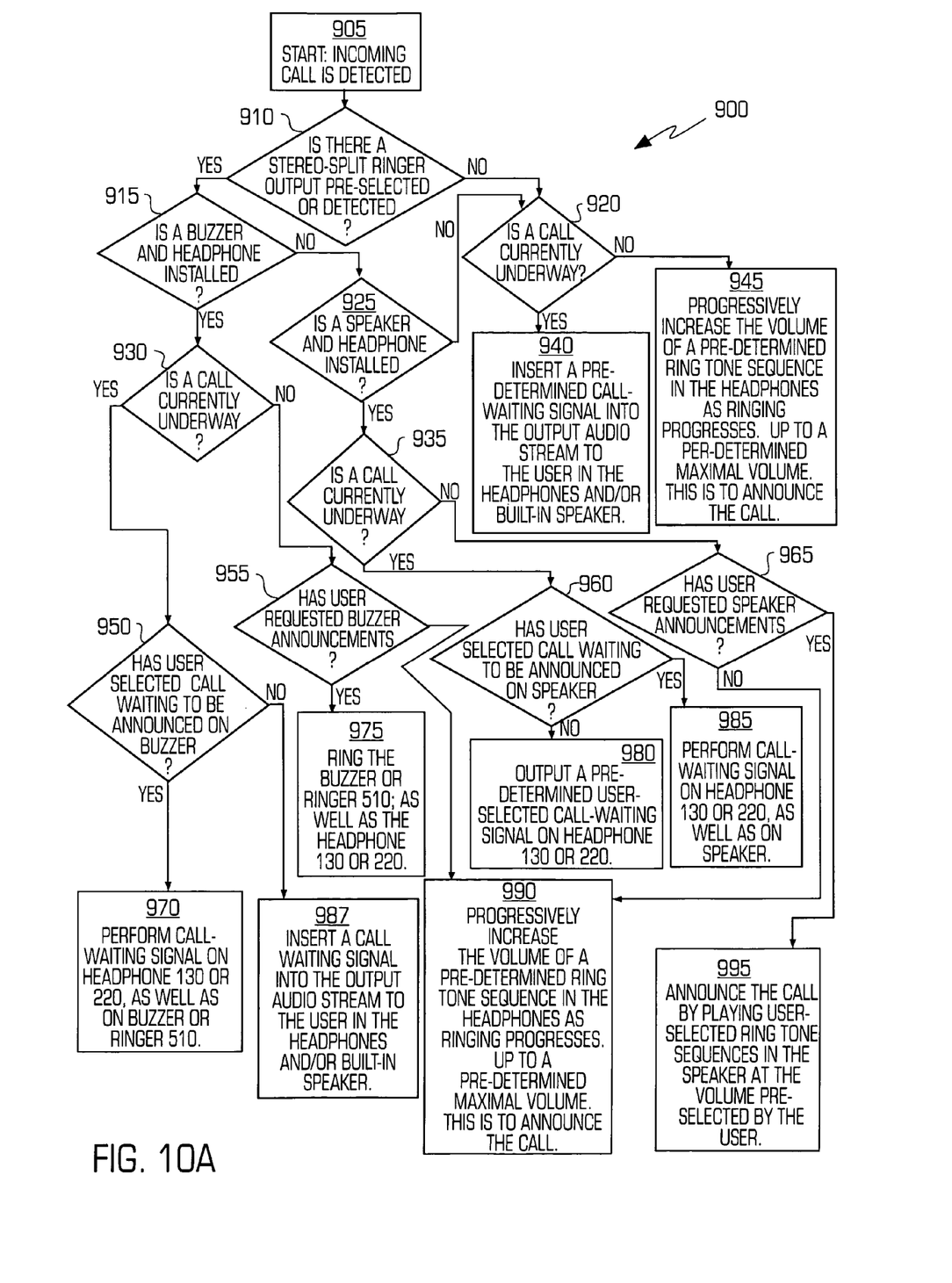
FIGS. 10A & 10B are flowcharts of the process on a computation device in accordance with the invention for announcing an incoming call to a user of a computation device.
Figure 10B:
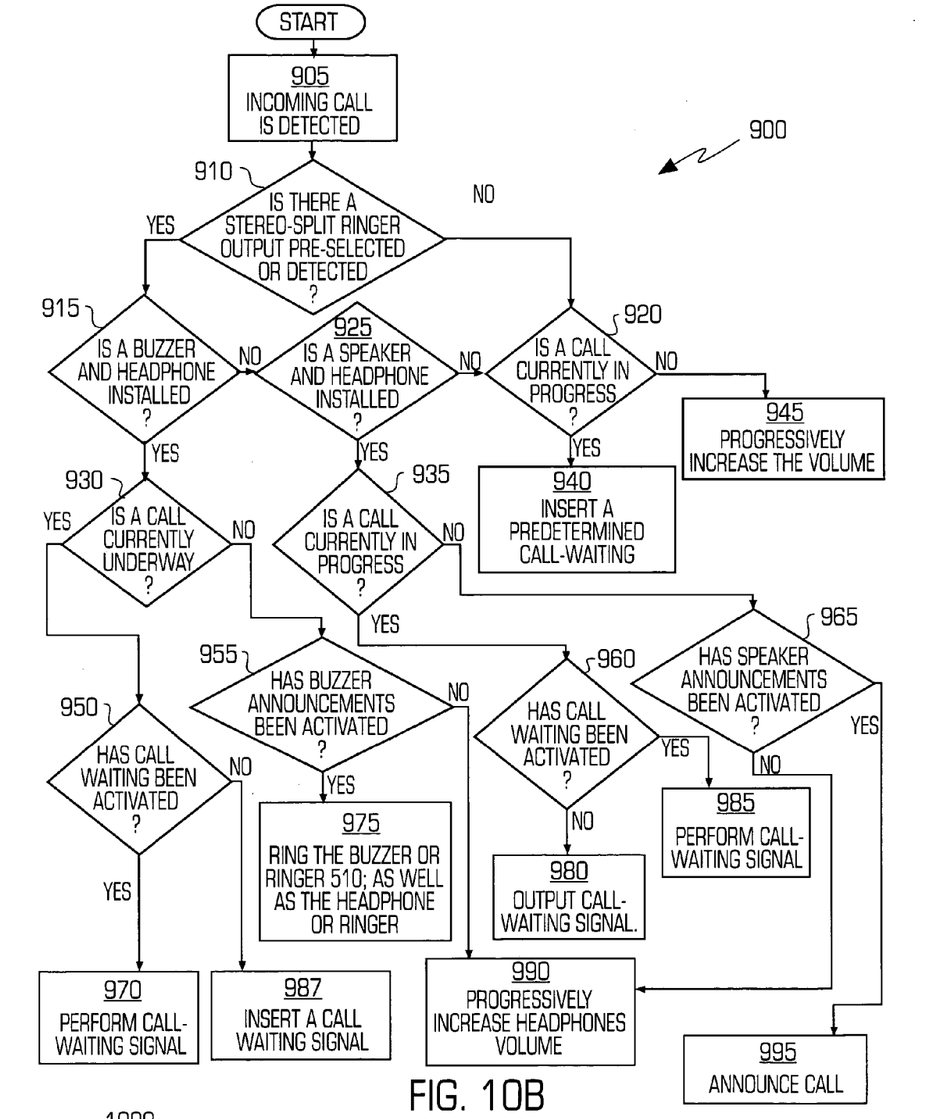

FIGS. 10A & 10B are flowcharts of a process 900 on a computation device in accordance with the invention for announcing an incoming call to a user of a computation device. In one example, the various event announcement devices described above in combination with the control program on the computing device may be used to implement this method. However, the method in accordance with the invention may be implemented using other event announcement devices and with, for example, a module that is incorporated into a VoIP program. For purposes of this example, the method is described in the context of a control program (having a plurality of instructions that are executed by the computing device) that performs many of the steps of functions of the method. In step 905, an incoming event (such as a call, email or page) is detected. In step 910, the control program determines if there is a stereo split ringer output pre-selected (by the user during a configuration process of the computing device and the VoIP application) or detected. The split may be detected, for example, by any well known electronic means. If a split ringer output is detected, then the control program determines if a buzzer and a headphone are installed in step 915. In step 930, if a buzzer and headphone are installed, then the control program determines if a incoming call is currently underway. If there is a current call underway, then in step 950 the control program determines if the user has selected call waiting to be announced on the buzzer. If call waiting announcement on the buzzer has been selected, then a call waiting signal is sent to the headphones (130 or 220) as well as the buzzer or ringer 510 in step 970. If the buzzer call waiting has not been selected, then the control program inserts a call waiting signal into the output audio stream, in step 987, to the user in the headphones and/or build-it speaker. Returning to step 930, if no call is currently underway, then the control program determines if the user has requested buzzer announcements in step 955 and rings the buzzer or ringer in step 975 as well as sends an audio output to the headphones. If the user has not selected buzzer announcements, then the control program may progressively increase the volume if a pre-determined ring tone sequence in the headphones as ringing progresses up to a maximal volume in step 990.

Returning to step 915, if there is no buzzer and headphone installed, then the control program determines if there is a speaker and headphone installed in step 925. If the speaker and headphones are installed, then the control program determines if there is a call currently underway in step 935. If there is a call currently underway, then the control program determines if the user has selected call waiting to be announced on the speaker in step 960. If the user has not selected call waiting announcement on the speaker, then the control program outputs a predetermined user-selected call-waiting signal on the headphones in step 990. If the call waiting announcement on the speaker is selected, then the call waiting signal is output to the headphones as well as the speaker in step 985. Returning to step 935, if the call is not underway, then the control program determines if the user has selected speaker announcements in step 965 and goes to step 990 described above if speaker announcement are not selected or announces the call by playing user-selected ring tone sequences in the speaker at the volume pre-selected by the user in step 995.

Returning to step 925, if there is no speaker and headphones installed or if there is no stereo-split ringer output detected in step 910, then the control program determines if there is a call underway in step 920. If there is not a call underway, then the control program may progressively increase the volume if a pre-determined ring tone sequence in the headphones as ringing progresses up to a maximal volume to announce the call in step 945. If a call is underway, then a predetermined call waiting signal is inserted into the output audio stream to the user in the headphones and/or the built-in speaker in step 940. FIG. 10B shows a simplified form the of the same flowchart. In this manner, using the novel event announcement devices described above and the control program, the call announcement method in accordance with the invention may be implemented. Now, several physical configurations of a novel connector will be described.

Figure 11:
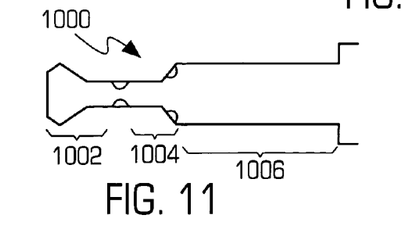
FIG. 11 is the physical configuration of externally observable conductors and insulators for a male gender connector that actuates the innermost and outermost of the three female receptacle connectors, but does not actuate the middle connector, leaving it internally connected as it would be had no external male connector been inserted.
Figure 12:
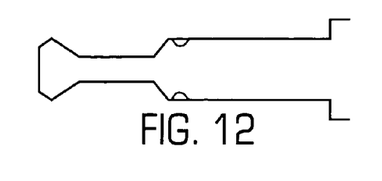
FIG. 12 is the physical configuration of externally observable conductors and insulators for a male gender connector that actuates the middle and outermost of the three female receptacle connectors, but does not actuate the innermost connector because it does not extend that far into it, leaving the innermost connection internally connected as it would be had no male connector been inserted.

FIG. 11 is the physical configuration of externally observable conductors and insulators for a male gender connector 1000 that actuates the innermost and outermost of the three female receptacle connectors, but does not actuate the middle connector, leaving it internally connected as it would be had no external male connector been inserted. In particular, the connector 1000 has a first portion 1002, a second portion 1004 and a third portion 106 as shown wherein the second portion 1004 is smaller in diameter than the first and third portions so that the middle connector of the female receptacle connector is not actuated. FIG. 12 is the physical configuration of externally observable conductors and insulators for a male gender connector 1010 that actuates the middle and outermost of the three female receptacle connectors, but does not actuate the innermost connector because it does not extend that far into it, leaving the innermost connection internally connected as it would be had no male connector been inserted.

These connectors shown in FIGS. 11 and 12 are adapted to aid in realizing aspects of the present invention. In particular, the mechanical connector in many computing devices, such as PDAs, when inserted, breaks the left and right side connectors independently. This makes it possible to make a connector that inserts into the PDA and which does not disconnect the on-board speaker, but instead leaves it connected to the right (resp. left) output, and connects the external speaker to the left (resp. right) output. Therefore, in an aspect of the invention, the special male connector (shown in general form in FIG. 11 and FIG. 12 for a popular series of connector types that come in various sizes) is inserted into the female stereo connector of the audio device that mechanically actuates only one of the two audio lines (either only the right audio channel in FIG. 12 only the left audio channel in FIG. 11) as well as the ground connector. These male connectors therefore leave the on-board speaker connected to the left (resp. right) audio driver, and can connect the right (resp. left) audio driver circuit to an external earphone. An advantage of this aspect of the invention is that it allows realization of the present invention on the popular Compaq iPAQ PDA without a wiring change internal to the existing installed devices, and without any external buzzer or speaker for call announcement. On the iPAQ and other devices, the connection to the on-board speaker is made to the middle connector only, so the innermost connector must be used for the external ear-phone.

However, on the iPAQ, the innermost connector is used by an electronic circuit in the iPAQ to determine if a male connector is inserted. If it is inserted, the electronic circuit senses the opened circuit on the internal connection of the innermost connector, and the IPAQ when sensing this then drives the middle circuit with a higher impedance driver to match the expected impedance of external earphones. Stated differently, if a connector as shown in FIG. 11 is inserted into the iPAQ stereo female receptacle, the on-board speaker remains connected, but it is driven with a higher impedance circuit. An effect of that impedance change is a greatly reduced volume of the sound output by the on-board speaker. This reduces the usefulness of that speaker when used to announce calls. Thus for some devices like the IPAQ it is not sufficient to simply insert such a connector but to also alter the internal behavior such that:

1) the sensing of an open circuit occurs independently on each of the left and right (middle and innermost) connectors, 2) the device is configured or user-configurable so that it does not automatically change the impedance of the driver circuit but leaves it to match the onboard speaker, or 3) an application on the device is able to control this behavior programmatically and that application, when running, is user configured so that it keeps the impedance of the driver circuit for the middle connector appropriate for driving the on-board speaker.

A person of ordinary skill in the art would appreciated that there are many possible ways to practice the present invention by using the built-in speaker of the device. Some devices would not need a special connector because the connections are not mechanically but are controlled electronically and on some devices are under control of the device.

The above event announcement devices may be used to implement various different embodiments of the invention. For example, in one aspect of the present invention, the on-board speaker is connected to the left (resp. right) output of the audio circuitry when a headphone is connected by insertion into the output jack, which is in turn then driven only by the right (resp. left) output of the audio output circuitry of the computation device. In this embodiment, the on-board speaker is disconnected only from one side of the stereo output when an output connector is inserted. The computation device might be configured by mechanical means or purely electronic means as a pre-determined option of the computation device, or it might be dynamically controlled by the software.

In yet another aspect of the present invention, the speaker has reduced functionality or reduced fidelity in that it cannot output general sound waveforms, but is instead capable only of performing a buzzer or ringer function. For example, a piezoelectric transducer or buzzer can be driven by a standard audio output to produce sufficiently loud sound to effectively announce an incoming call, much like a standard ringer for a telephone or for a cell phone. A benefit of using a piezoelectric device in this manner is that they can often be considerably smaller than a speaker for the same output in decibels, and they can be driven by the same output circuitry as an audio speaker. Since piezo devices are typically limited in frequency response, with the most responsive frequency predetermined at the time of manufacture, it is advantageous to configure the software of the computation device to effectively use a specific piezo device for call announcement.

Another embodiment of the present inventions provides for the utilizing the battery to vibrate the phone to either create and audible indication that a call is taking place or an indication by the vibration of the phone itself. In a still further embodiment of the present invention the antennae or surface bf the device is fitted with an light conducting filament, such as an optical fiber, wherein the filament is provided with a light source such as a laser or light emitting diode (LED) that is controlled by a circuit to intermittently flash to announce and incoming call, page, e-mail or event. The filament could be power by different colored light to identify the type of call. Additionally, the lighting of the filament is capable of being performed continually, i.e. either in an on or off state, or intermittently until the call, page etc. is answer and then go into an on state or off state as chosen by the user.

In order to realize the benefits of the present invention it is desired to include, in processing the intended sound for each of the two independent output devices, a mixing circuit/mechanism so that a stereo output device can output the sound samples for the one device mixed together with the sound samples intended for the other device. The ringer device, as is typical with phones, is silent almost all of the time. The ear-piece or telephony speaker is active during a call and may be active during a ringing event. The mixing of sound in a stereo output computation device is accomplished simply on most machines, and the documentation for accomplishing this is and has existed for many years for most platforms, like the Microsoft Windows series of platforms. The sound sample/s are typically 16-bit Linear Pulse Code Modulated (PCM) sound, which uses two bytes per sample and is the simplest and most commonly understood form of sound in digital format. The samples are arranged adjacently in a sequence, which is to say that first a left sample of 16 bits (two bytes) is written to memory. then a right sample of 16 bits (two bytes) is written to memory. The subsequent samples are written with first the left then the right again, and this is repeated until the desired block of sound with the desired number of samples is created. When that block is played, at any point in time one of a pair of two adjacent samples is being outputted simultaneously, one to the left and one to the right. It is in this way that a stereo sound maintains the precise relationship between the left and right channels. This is all well known in the art and is documented and available from many sources. References on multimedia programming, playing and creating sound files, and other references are well known in the art.

The following paragraph is an excerpt taken from the Microsoft Windows Platform Software Development Kit (SDK) documentation, for formatting stereo 16 bit sound. The description utilizes little-endian byte order, which means that low order bytes of a number precede higher order bytes. Other platforms would use big-endian byte order, both of which are well known and understood in the art.

Each sample is 4 bytes. Sample 1 is followed by samples 2, 3, 4 and so on. For each sample, the first byte is the low-order byte of channel 0 (left channel); the second byte is the high-order byte of channel 0; the third byte is the low-order byte of channel (right channel); and the fourth byte is the high-order byte of channel 1.

In order to play out the required sounds on the two differently used output devices, it is efficient and advantageous for the operating program to be efficient at playing out silence of each channel when there is not some specific output to play for that channel. When one channel has sound samples going out and the other has nothing, then mid-range values, which are zeros in 16 bit PCM, are matched to the samples for the other device to be played out and it is placed in the queue of the output device. Following these instructions is straight forward to those of ordinary skill in the art.

In one embodiment of the present invention, one output would be routed to external speakers and the other to a headphone set. The external speakers would be used to announce calls and the headphone for voice communication when the phone is used for a private conversation as a standard telephone is normally used. To use the PDA as a speaker phone, also commonly called conference mode, the voice traffic sound would be output to the external speakers as well as to the headphone set. The input microphone would nominally be set to a higher gain setting in speaker or conference mode so that all conversation would be captured.

The reader should note that this requires no physical connections to be broken or made in order to change mode of operation. This problem makes switching between a conference call and a private call inconvenient using a PDA in that it requires plugging and unplugging different output devices. A conference call here is defined as a call where the incoming sound is projected into a room or space and the microphone is used to pick up multiple users; a private call is a call where sound is output to a lower decibel device designed for the ear of one user. It is much more convenient to use the present invention as it can be achieved by the press of a button on the device. The button activation includes any of a host of well known ways to engage a PDA or similar device and is not limited to the notions of electro-mechanical buttons in that it comprises discrete moving parts, or a touch-pad view screen button, or a mouse or mouse-driven button.

In some environments, a full-sound speaker, as opposed to a simple buzzer or ringer, capable of outputting sufficiently loud call announcements (e.g. ring tones) may be larger than can effectively be used as an add-on component. Moreover, if in a particular case the size or shape of the physical device used is at issue, then a solution that is smaller or differently configured in some dimension may be needed. An aspect of the present invention solves this problem by using a smaller and simpler buzzing or ringing device.

In a further aspect of the present invention, the view screen is flashed without and additional auditory announcement to indicate that an incoming call, e-mail, voice mail, page or transmission of some type is taking place.

In an additional embodiment of the present invention, an antenna of the device is equipped with a fiber optic or similar type end piece that lights up and flashes continually or intermittently to indicate the presence of a new call, e-mail, voice-mail or page. Furthermore, this embodiment can also be used to indicate calendar events, such as a meeting or event, by flashing the antennae or utilizing some other visual or auditory cue or signal.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. An event announcement method for a mobile computing device that has an event announcement device coupled to the computing device via a stereo output interface having first, second and third portions, the computing device executing a control program, the method comprising:
    detecting an event associated with a Voice over Internet Protocol (VoIP) call;
    determining whether an external speaker system separate from a speaker internal to the computing device is directly physically connected to the stereo output interface via the first and third portions;
    determining whether a second external speaker system separate from the speaker internal to the computing device is connected to the output interface via the second and third portions; and
    generating, selectively, a predetermined event announcement signal based on the determination of whether the event announcement device is the external speaker system or the in-the-ear speaker system.

2. The method of claim 1 further comprising connecting the event announcement device to the computing device using a stereo jack.

3. The method of claim 2, wherein the event announcement device further comprises an external speaker separate from the speaker internal to the computing device and a set of headphones both connected to the stereo jack of the computing device and wherein the generation of the event announcement signal further comprises generating a sound signal by the external speaker.

4. The method of claim 3, wherein the connecting further comprises electrically connecting the external speaker to a first channel of the stereo jack and electrically connecting the set of headphones to a second channel of the stereo jack.

5. The method of claim 2, wherein the event announcement device further comprises an in-ear headphone separate from the speaker internal to the computing device plugged into the stereo jack and wherein generating the event announcement signal further comprises generating a sound signal by the internal speaker.

6. The method of claim 2, wherein the event announcement device further comprises a set of headphones separate from the speaker internal to the computing device and wherein generating the event announcement signal further comprises generating a sound signal by the internal speaker.

7. The method of claim 2, wherein the event announcement device further comprises a buzzer separate from the speaker internal to the computing device and wherein generating the event announcement signal further comprises generating a sound signal by the internal speaker.

8. The method of claim 2, wherein the event announcement device further comprises a buzzer and a set of headphones separate from the speaker internal to the computing device and wherein generating the event announcement signal further comprises generating a sound signal generated by the internal speaker.

9. The method of claim 2, wherein the event announcement device further comprises a buzzer and an in-ear headphone separate from the speaker internal to the computing device and wherein generating the event announcement signal further comprises generating a sound signal generated by the internal speaker.

10. The method of claim 1, wherein the event further comprises an incoming telephone call.

11. The method of claim 1, wherein the event further comprises an incoming VoIP telephone call.

12. The method of claim 1, wherein the event further comprises an incoming electronic mail message.

13. The method of claim 1, wherein the event further comprises an incoming page.

14. An event announcement system for a computing device, comprising:
    a computing device;
    an event announcement device coupled to the computing device via a stereo output interface having first, second and third portions; and
    a control program being executed by the computing device that manages Voice over Internet Protocol (VoIP) calls and controls the event announcement of the computing device, the control program further comprising instructions that determine the type of the event announcement device directly physically coupled to the computing device via the first and third portions and to determine whether a second type of event announcement device is coupled to the second and third portions, and instructions that generate a predetermined event announcement signal based on the determined type of event announcement device and whether an external speaker separate from a speaker internal to the computing device is attached to the computing device.

15. The system of claim 14, wherein the computing device further comprises a stereo jack into which the event announcement device is coupled.

16. The system of claim 15, wherein the event announcement device further comprises an external speaker separate from a speaker internal to the computing device and a set of headphones both connected to the stereo jack of the computing device and wherein the event announcement signal further comprises a sound signal generated by the speaker.

17. The system of claim 16, wherein the external speaker is electrically connected to a first channel of the stereo jack and wherein the set of headphones is electrically connected to a second channel of the stereo jack.

18. The system of claim 15, wherein the event announcement device further comprises an in-ear headphone separate from the speaker internal to the computing device plugged into the stereo jack and wherein the event announcement signal further comprises a sound signal generated by the internal speaker.

19. The system of claim 15, wherein the event announcement device further comprises a set of headphones separate from the speaker internal to the computing device and wherein the event announcement signal further comprises a sound signal generated by the internal speaker.

20. The system of claim 15, wherein the event announcement device further comprises a buzzer separate from the speaker internal to the computing device and wherein the event announcement signal further comprises a sound signal generated by the internal speaker.

21. The system of claim 15, wherein the event announcement device further comprises a buzzer and a set of headphones separate from the speaker internal to the computing device and wherein the event announcement signal further comprises a sound signal generated by the internal speaker.

22. The system of claim 15, wherein the event announcement device further comprises a buzzer and an in-ear headphone separate from the speaker internal to the computing device and wherein the event announcement signal further comprises a sound signal generated by the internal speaker.

23. The system of claim 15, wherein the stereo jack further comprises a portion which leaves an internal speaker of the computing device connected and a second portion which connects an external event announcement device to the computing device so that both the internal speaker and the external event announcement device are capable of generating the predetermined event announcement signal.

24. The system of claim 14, wherein the computing device further comprises a personal digital assistant.

25. The system of claim 14, wherein the event further comprises an incoming telephone call.

26. The system of claim 14, wherein the event further comprises an incoming VoIP telephone call.

27. The system of claim 14, wherein the event further comprises an incoming electronic mail message.

28. The system of claim 14, wherein the event further comprises an incoming page.

* * * * *